Figure 1:
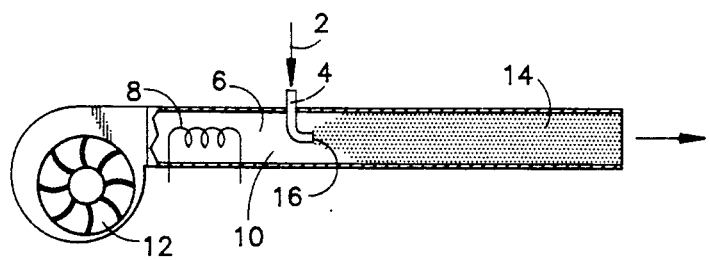

United States Patent

Rudy et al.

[11] Patent Number: 5,169,620
[45] Date of Patent: Dec. 8, 1992

[54] METHOD AND APPARATUS FOR THE MANUFACTURE OF IRON OXIDE PARTICLES

[75] Inventors: Thomas P. Rudy, Saratoga; Forrest R. Goodson, San Jose, both of Calif.

[73] Assignee: United Technologies Corporation, Hartford, Conn.

[21] Appl. No.: 618,772

[22] Filed: Nov. 27, 1990

[51] Int. Cl.⁵ .................. C01G 49/02; C01G 49/04; B01J 12/02
[52] U.S. Cl. .................. 423/633; 423/634; 422/220
[58] Field of Search ............... 423/633, 634; 562/325, 562/338; 422/220

[56] References Cited

U.S. PATENT DOCUMENTS

| | | | |
|---|---|---|---|
| 2,772,956 | 12/1956 | West et al. | 75/413 |
| 2,851,347 | 9/1958 | Schlecht et al. | 75/413 |
| 2,900,245 | 8/1959 | Beller | 75/413 |
| 2,938,781 | 5/1960 | Schmeckenbecher | 75/413 |
| 3,361,525 | 1/1968 | De Rycke et al. | 423/337 |
| 4,056,386 | 11/1977 | McEwan et al. | 75/413 |
| 4,073,874 | 2/1978 | Fukushima | 423/500 |
| 4,145,301 | 3/1979 | Bruylants et al. | 252/62.56 |
| 4,424,085 | 1/1984 | Fukuma et al. | 149/19.1 |
| 4,608,239 | 8/1986 | Devon | 423/210 |
| 4,652,305 | 3/1987 | Ebenhoech et al. | 75/413 |
| 4,826,671 | 5/1989 | Arndt et al. | 423/633 |
| 4,854,981 | 8/1989 | Goodson et al. | 149/2 |
| 4,881,994 | 11/1989 | Rudy et al. | 149/109.4 |
| 5,004,504 | 4/1991 | Schroeder et al. | 423/633 |
| 5,047,382 | 9/1991 | Rudy et al. | 502/338 |

OTHER PUBLICATIONS

Perry, J. H., ed. "Chemical Engineers Handbook" 4th ed, pp. 18–63.
Perry, J. H., ed. "Chemical Engineers Handbook" 5th ed, pp. 18-74–18-75.
Gail D. Ulrich, "Theory of Particle Formation and Growth in Oxide Synthesis Flames," Combustion Science and Technology, 1971, vol. 4, pp. 47–57.
G. D. Ulrich, N. S. Subramanian, "Particle Growth in Flames Coalescence as a Rate Controlling Process," Combustion Science and Technology, 1977, vol. 17, pp. 119–126.
G. D. Ulrich; J. W. Riehl "Aggregation and Growth of Submicron Oxide Particles in Flames", pp. 257–265.

Primary Examiner—John Niebling
Assistant Examiner—Brian M. Bolam

[57] ABSTRACT

An improved method of manufacturing superfine iron oxide particles by introducing a gas mixture of a non-oxidizing gas and an iron-containing compound into a stream of heated oxidizing gas, wherein the improvement resides in the use of an insulated injector to introduce the gas mixtures into the heated oxidizing gas stream.

11 Claims, 1 Drawing Sheet

METHOD AND APPARATUS FOR THE MANUFACTURE OF IRON OXIDE PARTICLES

TECHNICAL FIELD

The technical field to which this invention relates is the field of iron oxide production and iron oxide catalysts for solid rocket propellant.

BACKGROUND OF THE INVENTION

In the field of composite rocket propellants useful in various rocket motors, increasing the burn rate is a constant challenge. Such an increase in the burn rate of such solid propellants leads to an increase in the mass flux of combustion gases and therefore an increase in the thrust generated by the motor. One of the critical features in the ability to develop improved motors of this type has been the introduction of burning rate catalysts which accelerate the burning rate of the rocket propellant. Of the wide number of such catalysts one, iron oxide, has proven to be quite successful. It has further been discovered that for optimum efficiency and performance of these catalysts, it is desirable to have the iron oxide particles as small as possible and preferably smaller than 100 angstroms. The manufacture and the use of iron oxide catalysts and propellants utilizing such catalysts are set forth in commonly assigned U.S. Pat. No. 4,854,981 the disclosure of which is incorporated herein.

The manufacture of such iron oxide, as described in the above referenced patent and depicted in schematic form in FIG. 1 herein, comprises introducing a gas stream of iron-containing compound, which has been mixed with a non-oxidizing gas, 2 through an injector 4 into a stream of hot oxidizing gas 6 which has been heated by a heater 8 inside a reactor chamber 10. The dilute iron-containing compound then contacts the hot oxidizing gas, which is forced through the reactor 10 by a blower 12 and thereby causing the iron-containing compound to oxidize to iron oxide in very fine particle sizes 14.

The drawback to the above described method is that during extended production runs some of the oxidation of the iron-containing compound to iron oxide occurs at the tip or port 16 of the injector 4 where the iron-containing compound mixture enters the reaction chamber 10 causing a build-up of iron oxide at the port 16. This, obviously, impairs the operation of the injector and just as importantly results in the development of undesirably large iron oxide particles which slough off during production runs thereby contaminating the iron oxide product.

One method which addresses the problem resulting from the operation of the '981 patent is discussed in pending U.S. patent application Ser. No. 283,117 and which is commonly assigned and is also incorporated herein a schematic of which is set forth herein as FIG. 2. This method is very similar to the previously discussed method in which a gaseous stream of an iron-containing compound 2 is introduced into a reactor duct 10 through an injector 4 and into an oxidizing gas 6 which is heated to an appropriate temperature by heater 8 and is simultaneously forced through the reactor duct by a blower 12. However, in this invention the iron-containing compound is diluted with a stream of cool oxidizing gas which is blown through a feed duct 18 by blower 20. The output of the feed duct 18 discharges into the stream of hot oxidizing gas in reactor duct 10. This resulted in a more complete reaction between the iron compound and the oxidizing gas and prevented the growth of iron oxide particles at the injector port 16. However, it has been discovered that even this improvement was subject to the deposition of iron oxide on the wall of the reaction chamber 22 downstream from the point of entry of the cool iron-containing compound gas/oxidizing gas where the gas mixture contacts the hot reactor wall. This deposit is at a temperature well above that at which the fine iron oxide particles anneal and lose surface area. When the layer of dense, annealed material grows thick enough, it sloughs off, enters the stream of iron oxide particles and contaminates the desired low density, high surface area iron oxide product.

Therefore, what is needed in this art is an improved method for producing the iron oxide particles having high surface area, low density and very small particle sizes and which can be operated free of the problems connected with the prior methods.

DISCLOSURE OF THE INVENTION

This invention is directed toward an improved method for the production of iron oxide particles useful as solid rocket propellant catalysts. The method comprises introducing a mixture of a gaseous iron-containing compound and a non-oxidizing gas into a reaction chamber where it contacts a oxidizing gas forming superfine iron oxide particles wherein the gaseous mixture to be introduced into the reaction chamber is introduced through an insulated, conical pointed injector.

Also disclosed is an apparatus for use in said improved method.

BRIEF DESCRIPTION OF THE INVENTION

FIG. 1 is a schematic drawing of a method for the manufacture of iron oxide particles described in U.S. Pat. No. 4,854,981.

Figure 2:
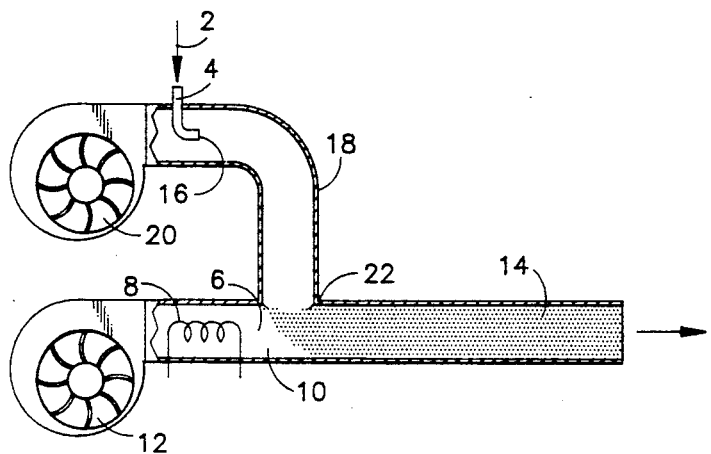

FIG. 2 is an alternative method for the production of the iron oxide particles described in pending U.S. Pat. application Ser. No. 07/283,117.

Figure 3:
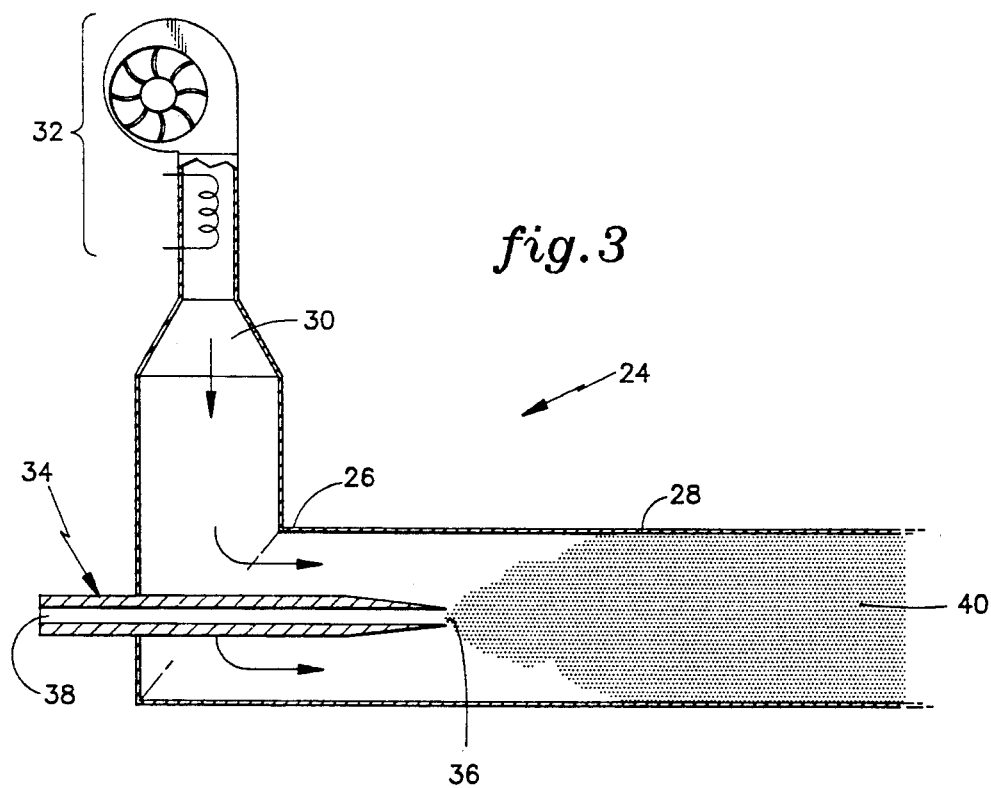

FIG. 3 is a schematic of the present method for the production of iron oxide particles.

BEST MODE FOR CARRYING OUT THE INVENTION

To overcome the shortcomings associated with the prior art production methods, it is proposed to use an insulated, conically pointed injector to introduce the gaseous iron-containing compound/non-oxidizing gas mixture through the injector passageway into the reactor chamber. The insulated injector should be formed of such material and in such dimensions so as to maintain an internal surface temperature of the injector passageway below that necessary to oxidize the iron-containing compound to iron oxide or decompose the iron-containing compound to metallic iron.

Such material may be a glass ceramic, a mineral insulation such as calcium silicate preferably a material called Marinite ® available from Manville Products or fluorinated hydrocarbon polymer such as polytetrafluorothylene or other materials having heat conductivities less than 5 BTU/Hr/SqFt/°F. (Thermal conductivity expressed in these units is commonly designated "k factor".) It should be kept in mind that any such material chosen should be dimensionally stable and chemically stable at the temperatures and in the environment under which this apparatus is operated. Further, such materials should be easily manufactured into the desired shape either by machining or molding processes. A further desirable property that such an injector material have is that it should be easily handleable and sturdy. It has been found that some compromises may have to be made in the selection of such materials depending on the operating parameters of the process. For instance it has been found that an injector may be easily manufactured from polytetrafluoroethylene and is very sturdy, but if operated above a temperature of about 625° F. it loses its dimensional stability. On the other hand an injector made from calcium silicate may be operated at significantly higher temperatures but is brittle and easily fractured.

The injector may be of any number of shapes, however, a round, tubular structure is preferred. Such an injector may be formed of a single block of material or it may be constructed as a combination of different materials. In the injector formed from calcium silicate the injector was constructed of a layer of calcium silicate sandwiched between two tubes of stainless steel. The thickness of the walls of such injectors will vary depending on the k factor of the material used to produce the injector and the anticipated reactor operating temperatures. However, wall thicknesses between about 0.05 inch and about 1.0 inch are likely with preferred thicknesses between about 0.25 inch and about 0.5 inch. The injector tip or port should be conically tapered to offer a streamlined aerodynamic profile and reduce turbulence at the port. By preventing premature heating of the iron-containing compound and preventing recirculation due to turbulence at the exit, the injector does not need to be cleaned or replaced. This allows continuous operation. It has been found that tapers at the tip of between about 5° to about 15° half angle (that angle defined by a center line of the passageway through the injector and the tapered point) is desirable with about 5° to about 10° being preferred. Naturally, at the tip where the insulation becomes thin, the possibility exists that premature decomposition or oxidation will occur because the internal temperature a the injector tip becomes too high. To prevent this from happening, one should increase and maintain the flow of carrier gas/iron-containing compound to limit the temperature rise. The flow rate would have to be determined empirically as it will vary with the type of injector, the design and the material of construction and the temperature of the hot oxidizing gas.

The injector should be positioned inside the reactor in such a way that the tip of the injector and therefore the flow of the iron-containing compound/non-oxidizing gas mixture is coaxial to the flow of heated oxidizing gas to further reduce the likelihood of undesirable turbulence. Further it is desirable to position the injector such that when the oxidizing gas contacts the iron-containing compound mixture the gases react prior to coming into contact with the walls of the reactor or other component of the reactor which may be heated and therefore act as a hot spot causing the iron oxide formed to accumulate on its surface. Typically such a situation can be avoided by positioning the injector opening about 2 inches to about 4 inches away from the wall or other component within the reactor for a reactor operating at $\approx 625°$ F. and oxidizing iron pentacarbonyl. Naturally, the actual position will depend on the flow rates, temperature and material being oxidized, however, these parameters may be easily determined without undue experimentation.

Further, the passageway through the injector through which the iron-containing compound/non-oxidizing gas mixture passes into the reactor, is typically straight and, although its dimension may vary, will preferably be between about 3/16 inch to about 1 inch in diameter. However, depending on the size of the reactor and the flow rates of the reactants passageway dimensions ranging from ⅛ inch to about 2 inches may be possible.

A typical reactor incorporating the present invention is depicted in FIG. 3. This figure is meant to be exemplary and not limiting. As may be seen from this figure the reactor 24 comprises a duct having a right angle turn 26 which then continues in a straight section of reaction duct 28 through a helical cooling section (not shown) and thence to an electrostatic precipitator (not shown) which precipitates the iron oxide particles. The oxidizing gas is introduced at entry port 30 after being heated by a resistance heater/blower 32. As the heated oxidizing gas progresses through the duct it encounters the right angle bend 26. At this point it also encounters the insulated injector 34 positioned such that the outlet of the injector 36 is coaxial to the reactor portion of the duct 28 and the flow of the heated oxidation gas. As the heated gas passes into the reactor portion of the duct it forms a coaxial flow of heated gas about the injector 34. At the same time the heated gas is passing around the injector a stream of a gas mixture of iron-containing compound and a non-oxidizing gas is caused to flow through the passageway 38 in the injector 34 and out the injector port 36 where it contacts the hot oxidizing gas and the iron-containing compound is oxidized to iron oxide particles 40. The oxidizing stream containing the now converted iron compound as iron oxide continues down the reactor duct 28 to a precipitator (not shown) where the iron oxide particles are precipitated out of the stream.

Generally, any iron-containing compound that is capable of being vaporized without significant decomposition at a temperature below about 900° F. and is capable of reacting at temperatures below about 900° F. with an oxygen-containing atmosphere to form iron oxide as the exclusive solid product (e.g., susceptible to oxidation) may be used in this invention. It is important that the compound be capable of being vaporized without decomposition at a temperature below about 900° F. because the most finely divided (e.g., smallest particle size) product is obtained only if the iron atoms in the starting material are spatially widely separated. If they are closely associated, as in a condensed (i.e., solid or liquid) compound, the particles of the product of oxidation will contain many iron atoms (i.e., the iron oxide particles will be relatively large). It is important that the compound be capable of reacting at temperatures below about 900° F. with an oxygen-containing atmosphere to form iron oxide as the exclusive solid product because unconverted starting material or solid products other than iron oxide are likely to be inferior burning rate catalysts and to exert harmful effects on propellant properties other than burning rate (e.g., shortened pot life and impaired aging stability). At temperatures above 900° F. agglomeration and sintering of the oxidation product will occur with loss of specific surface area resulting in reduced catalytic activity.

It is also preferred that the iron-containing compound have a high iron content to increase the yield of the desired iron oxide product. Finally, it is preferred that the iron-containing compound be essentially free of any impurities that will not be converted into harmless gases in the oxidation step. In particular, impurities containing metals other than iron are usually very undesirable.

It is especially preferred to employ compounds containing only the elements carbon, hydrogen, nitrogen and oxygen in addition to iron. The presence of halogens, sulfur, phosphorous and boron is undesirable because it interferes with the complete conversion to the oxide. In addition, phosphorous, boron and sulfur can form a glassy product or undesired solid residue that coats the iron oxide.

Preferred generic classes of iron-containing compounds are carbonyls, chelates of beta diketones, complex cyanides and ferrocene derivatives. These are preferred because they contain adequate concentration of iron, exhibit the required volatility and thermal stability, and oxidize readily at elevated temperatures to form as a solid product only iron oxide. Exemplary compounds include ferric acetylacetonate, ferrous ferrocyanide and ferrocenes (e.g., lower alkyl).

It is especially preferred that iron pentacarbonyl (available from GAF Corporation, New York, N.Y.) be used because of its high volatility, low melting point, high iron content and stability in the dark at temperatures well above its boiling point. Finally, it produces a superior catalyst.

Typically, an inert carrier gas (e.g., nitrogen) is used to transfer the vapor of an iron-containing starting material such as iron pentacarbonyl to the oxidation site.

Oxidation of the iron compound requires an oxygen-containing gas (e.g., air). Preferably, it is essentially free of any impurities that will not be converted into harmless gases in the oxidation step. Generally, the oxygen must be present in at least about 10% by volume in order to ensure complete and prompt oxidation.

The catalysts of this invention may be made by the vaporization of the above-described iron-containing compounds in the oxygen environment (typically carried by an incombustible carrier gas). The iron compound is then oxidized. It is preferred that iron pentacarbonyl be oxidized at a temperature between about 300° F. and 900° F. Below about 300° F., insignificant (if any) quantities of $Fe_2O_3$ are formed. Above about 900° F., the temperature is such as to significantly raise the particle size. It is especially preferred that iron pentacarbonyl be oxidized at a temperature between about 400° F. and about 750° F. Below about 400° F., the yield of $Fe_2O_3$ is low (e.g. below about 10%) and above about 750° F., the crystals start to anneal with a resultant increase in particle size, consequent loss of crystal surface area and thus loss of catalytic surface area.

For those iron-containing compounds that are liquids at the vaporization temperature, the incombustible carrier gas may be bubbled through the iron-containing liquid and the resultant vapor/carrier mixture combined with heated air from a blower and fed to a reactor duct where it is spontaneously oxidized. The oxidation products 40 are drawn through an electrostatic precipitator by a squirrel cage blower. A suitable electrostatic precipitator is an Emerson Electronic Air Cleaner, Model 14C22M41000 (available from White-Rodgers, Inc., Electro-Air Division, Harrison, Ark.). A suitable squirrel cage blower is a Dayton 525 cfm Blower-AOL, Model 4C3445-A (available from W. W. Grainger, Inc. Chicago, Ill.). The resulting catalysts may then be collected by scraping or simply shaking the electrodes of the precipitator.

Those iron-containing compounds that are solids at the vaporization temperature may be vaporized into the carrier gas by directing a stream of the latter over the surface of the solid compound and continuing as described above with oxidation, precipitation and collection. It is preferable that the vapor pressure of the solid compound be greater than about 0.0005 atmospheres. This enables the collection of adequate quantities of catalyst. It is especially preferred that the vapor pressure be greater than about 0.01 atmospheres to provide a conveniently high rate of production of catalyst. These vapor pressures can be achieved by raising the temperature of the vaporizing compound.

The product of these processes is a very finely divided, highly catalytically active, anhydrous oxide. A number of characteristics are believed to contribute to its high activity. The most important is its enormous surface area provided by average particle diameters that are less than about 100 Å and even 50 Å. The particles typically have globular shapes that provide improved processibility. Generally, the average specific surface area is greater than about 250 $m^2/g$.

Typically, the above catalysts are used as a burning rate accelerator for an ammonium perchlorate based rocket propellant. However, it is also believed that propellants based on other perchlorates (e.g., potassium perchlorate) would be enhanced with the use of the above catalyst. Typically, a variety of other conventional components and additives are compounded (added) in conventional amounts to facilitate use a rocket propellant. An exemplary list of additives includes fuel binders, curing agents, plasticizers, adhesion-increasing agents (i.e., bonding agents) antioxidants, powdered metal fuels, and combustion stabilizers.

Although this invention has been described in terms of the production of a iron oxide catalyst for use in rocket propellants, the iron oxide may also be used advantageously in other gas-phase oxidation processes requiring a solid, refractory catalyst of high surface area.

This invention provides a convenient process for producing a rocket propellant burning rate catalyst that has excellent catalytic activity. Specifically, the process results in a very finely divided iron oxide that produces a high burning rate and a low pressure exponent.

EXAMPLE

An injector was fabricated by positioning concentrically two thin walled (1/16 inch) stainless steel tubes, one inside the other. The outer tube had an outside dimension of 1.0 inch and the inner tube had an outside dimension of ⅜ inch. At the injector port, the smaller inner tube projected about 2 inches beyond the end of the larger tube, thereby creating when the tube was completed, a tapered or conical end having a taper equal to about 15° half angle. The overall length of the injector was 12 inches and having an internal passageway or bore of ¼ inch in diameter. The annular cavity between the two tubes was filled with calcium silicate insulation (Marinite available from the Manville Products Corporation of Denver, Colo.) which was tapered from the termination of the outer tube to the end of the inner tube to form the conical tip. This insulated injector was then mounted concentric with the 4.0 inch diameter reactor duct by means of an insulated support plate at the point of entry.

Referring to FIG. 3 again, the downstream, cooling section of the reaction duct (not shown) was constructed of 30 feet of flexible, corrugated, 4-inch diameter, thinwall (0.020 inch) aluminum ducting in the form of a freestanding helix. The upstream section consisted of a 26 inch length of 4-inch diameter, 26 gauge, rigid stainless steel duct, the upstream end of which was connected at a right angle 26 to a similar hot air feed duct. During operation the oxidizing gas (air) issuing at 650° F. from the blower/heater 32 entered the reactor duct 28 at a rate of about 173 cubic feet per minute.

A mixture of gaseous iron pentacarbonyl which was vaporized at an average rate of 4.6 grams per minute was mixed with a nitrogen carrier gas at a flow rate of about 60 liters per minute. This mixture was then introduced into the reactor duct 28 through the insulated injector passage 38 where it exited the injector port 36 concentric with the flow of heated oxidizing gas and was oxidized to iron oxide particles which were then precipitated out of the stream by an electrostatic precipitator.

The process was operated for 440 minutes providing 757 grams of superfine iron oxide from about 2025 grams of iron pentacarbonyl or a 65.7 percent conversion. The specific surface area of the particles was 281 square meters per gram and the particle size was approximately 50 Å.

After disassembly and inspection it was found that the injector tip 36 and the reactor duct 28 were virtually free of iron or iron oxide deposits that had collected profusely in prior art processes.

This reactor operated with the insulated injector does not develop the harmful deposits of the prior art reactors. It has been found that by insulating the injector so that the internal surfaces are not heated above the oxidation temperature of the iron-containing compound and the port area or the gases exiting the port of the injector are at a temperature below the oxidation temperature of the iron-containing compound that oxidation does not occur in the close proximity of the injector port and therefore unwanted deposits of iron oxide do not develop at the port. Further, because the injector is positioned coaxially to the stream of heated oxidizing gas the actual oxidation reaction of the iron-containing compound to iron oxide occurs substantially in the center of the reactor duct away from any "hot spots" on the walls of the reactor or other components in the reactor duct.

What is claimed is:

1. A method for manufacturing iron oxide particles comprising:
   a. mixing a non oxidizing gas and vapor to flow iron-containing compound;
   b. causing the mixed gas and vapor to flow through a thermally insulated injector having a conically pointed tip;
   c. heating an oxidizing gas to a temperature sufficient to cause the vaporized iron containing compound to oxidize when said oxidizing gas contacts the iron containing vapor;
   d. causing said heated oxidizing gas to flow coaxially about the ejector such that as the heated oxidizing gas flows about the conically shaped ejector tip a reduction in turbulence in the oxidizing gas flow is achieved resulting in a reduction in the premature oxidation of the iron containing vapor, wherein said heated oxidizing gas contacts said iron containing vapor causing the iron to oxidize to iron oxide particles.

2. The method of claim 1 wherein the resulting iron oxide particle size is less than 100 Å.

3. The method of claim 1 wherein the iron-containing compound is a carbonyl, chelate of a beta diketone, complex cyanide or ferrocene derivative.

4. The method of claim 3 wherein the iron-containing compound is iron pentacarbonyl.

5. The method of claim 1 wherein the insulated, conically pointed injector is comprised of a material having a thermal conductivity less than 5 BTU/Hr/SqFt/°F.

6. The method of claim 4 wherein said iron carbonyl is oxidized at a temperature between about 300° F. to about 900° F.

7. The method of claim 4 wherein said iron pentacarbonyl is oxidized at a temperature of about 400° F. to about 750° F.

8. An apparatus for the production of iron oxide particles comprising a reaction chamber, a heated oxidizing gas and a means for introducing said heated gas into the reaction chamber, a mixture of an iron-containing compound and a non-oxidizing gas said gas mixture having a temperature below the decomposition temperature of the iron-containing compound, and a means for introducing said gas mixture into the reaction chamber and into contact with the oxidizing gas wherein the improvement comprises a means for introducing said gas mixture that is a thermally insulated, conically pointed injector positioned coaxially with the flow of the oxidizing gas.

9. The apparatus of claim 8 wherein the injector has a thermal conductivity of less than 5 BTU/Hr/SqFt/°F.

10. The apparatus of claim 9 wherein the injector is made of polytetrafluoroethylene.

11. The apparatus of claim 9 wherein the injector comprises calcium silicate.

* * * * *

UNITED STATES PATENT AND TRADEMARK OFFICE
CERTIFICATE OF CORRECTION

PATENT NO. : 5,169,620

DATED : December 8, 1992

INVENTOR(S) : Thomas P. Rudy et al

It is certified that error appears in the above-identified patent and that said Letters Patent is hereby corrected as shown below:

Column 7, line 52, should read --a. mixing a non oxidizing gas and a vaporized iron- --

Signed and Sealed this

Seventeenth Day of December, 1996

*Attest:*

BRUCE LEHMAN

*Attesting Officer*     *Commissioner of Patents and Trademarks*